(12) United States Patent
Edwards

(10) Patent No.: US 12,470,635 B2
(45) Date of Patent: *Nov. 11, 2025

(54) MULTI-DETERMINISTIC DYNAMIC CONTENT STREAMING

(71) Applicant: Disney Enterprises, Inc., Burbank, CA (US)

(72) Inventor: Jon M. Edwards, Anaheim, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,150

(22) Filed: Sep. 25, 2019

(65) Prior Publication Data

US 2020/0021630 A1   Jan. 16, 2020

Related U.S. Application Data

(63) Continuation of application No. 14/970,605, filed on Dec. 16, 2015, now Pat. No. 10,476,922.

(51) Int. Cl.
*H04L 67/306* (2022.01)
*H04L 65/61* (2022.01)
(Continued)

(52) U.S. Cl.
CPC .......... *H04L 67/306* (2013.01); *H04L 65/61* (2022.05); *H04L 65/611* (2022.05); *H04L 67/535* (2022.05)

(58) Field of Classification Search
CPC . H04L 65/4069; H04L 67/306; H04L 65/601; H04L 67/22
See application file for complete search history.

(56) References Cited

U.S. PATENT DOCUMENTS 7,191,461 B1   3/2007   Arsenault et al.
7,334,249 B1 *  2/2008   Byers ............... H04N 21/44222
                                                 725/35
(Continued)

FOREIGN PATENT DOCUMENTS

CN   102150434 A  *  8/2011  ......... H04N 13/0048

OTHER PUBLICATIONS

De Bruyne et al., "Annotation based personalized adaptation and presentation of videos for mobile applications", Multimedia Tools and Applications, Nov. 2011, vol. 55, Issue, 2 pp. 307-331, first online Jul. 28, 2010, <http://link.springer.com/article/10.1007%2Fs11042-010-0575-2#page-1>.

(Continued)

*Primary Examiner* — Hua Fan
(74) *Attorney, Agent, or Firm* — Dorsey & Whitney LLP

(57) ABSTRACT

Techniques for dynamic content streaming. Based on analyzing respective client data of each of multiple client devices, a respective profile corresponding to a current session on the respective client device is determined. Based on the respective profile for each client device, a respective custom video modification to apply to a first video stream is determined. The respective custom video modification is applied to the first video stream to create a modified video stream having a relatively greater measure of conformity to the respective profile than prior to modification. Each modified video stream is transmitted to the respective client device for output.

26 Claims, 6 Drawing Sheets

(51) Int. Cl.
*H04L 65/611* (2022.01)
*H04L 67/50* (2022.01)

(56) References Cited

U.S. PATENT DOCUMENTS

| | | | |
|---|---|---|---|
| 7,945,926 B2 | 5/2011 | Dempski et al. | |
| 8,544,047 B2 | 9/2013 | Tu et al. | |
| 10,476,922 B2 | 11/2019 | Edwards | |
| 2001/0013123 A1* | 8/2001 | Freeman | H04N 21/4347 |
| | | | 348/E7.071 |
| 2003/0065803 A1 | 4/2003 | Heuvelman | |
| 2004/0043365 A1* | 3/2004 | Kelley | G09B 5/02 |
| | | | 434/178 |
| 2008/0163059 A1 | 7/2008 | Craner | |
| 2009/0204640 A1* | 8/2009 | Christensen | G11C 7/1078 |
| 2009/0249390 A1 | 10/2009 | Corvin | |
| 2009/0288112 A1* | 11/2009 | Kandekar | H04N 7/163 |
| | | | 725/32 |
| 2011/0129201 A1 | 6/2011 | Mclean | |
| 2011/0177775 A1 | 7/2011 | Gupta et al. | |
| 2013/0014159 A1 | 1/2013 | Wiser et al. | |
| 2013/0103766 A1* | 4/2013 | Gupta | G06Q 10/107 |
| | | | 709/206 |
| 2013/0254828 A1 | 9/2013 | Reimers et al. | |
| 2013/0332835 A1* | 12/2013 | Mace | H04N 21/4668 |
| | | | 715/720 |
| 2013/0336628 A1* | 12/2013 | Lamb | G01S 5/16 |
| | | | 386/224 |
| 2014/0080109 A1* | 3/2014 | Haseltine | A63F 13/40 |
| | | | 434/308 |
| 2014/0129942 A1 | 5/2014 | Rathod | |
| 2014/0168277 A1 | 6/2014 | Ashley et al. | |
| 2014/0215508 A1 | 7/2014 | Wyatt et al. | |
| 2014/0219438 A1* | 8/2014 | Brown | H04M 3/5191 |
| | | | 379/265.09 |
| 2016/0364397 A1 | 12/2016 | Lindner et al. | |
| 2016/0366126 A1* | 12/2016 | Sharifi | H04W 12/06 |

OTHER PUBLICATIONS

Fredrik Johansson, "Investigation and Integration of a Scalable Vector Graphics Engine on a Set-Top Box", Apr. 22, 2008, master thesis, 72 pages. http://www.uppsatser.se/uppsats/826af_13129/.

* cited by examiner

MULTI-DETERMINISTIC DYNAMIC CONTENT STREAMING

CROSS-REFERENCE TO RELATED APPLICATIONS

This application is a continuation of co-pending U.S. patent application Ser. No. 14/970,605, which was filed on Dec. 16, 2015 and which is herein incorporated by reference in its entirety.

BACKGROUND

Field of the Invention

Embodiments generally relate to video streaming services that provide a customized video stream based on user-specific preferences.

Description of the Related Art

As the bandwidth of personal network connections continues to increase, many content providers are providing online streaming video services for viewing their content. For example, many services offer on-demand streaming of video content (e.g., movies, television show episodes, etc.). Additionally, other services offer online streaming services for broadcast video services (e.g., digital broadcast television channel streams). Generally, as used herein, a digital broadcast television stream refers to a digitally encoded video stream consisting of a number of different television shows and suitable for transmission over a computer network, e.g., the Internet. Such a stream can include television shows, as well as additional video content such as commercials, and generally mirrors the content of a television network transmitted over a traditional television system (e.g., an analog television system using Phase Alternating Line (PAL) encoding, a digital television system conforming to Advanced Television Systems Committee (ATSC) standards, etc.). A digital broadcast television stream may be continuous, in that the stream includes video content for each moment throughout the day.

Online video streaming provides users with rich opportunities to upload, watch and share videos in fast-growing online communities. Users can share videos by electronically mailing links or embedding links on web pages such as online blogs. Users can also rate and comment on videos, bringing new social aspects to viewing.

Generally, video streams have various quality levels, e.g., low, medium and high. Video quality is one characteristic of a video passed through a video processing/transmission system and is often measured by the perceived degradation compared to the original video stream. Generally, transmitting a high quality video stream generally requires a high bitrate, high resolution and high requirement for network bandwidth. While lower resolution video streams can be transmitted across lower bandwidth network connections, such video streams are generally lower in quality and thus are less preferable relative to higher quality video streams.

Generally, when a networked client device streams video content from a server, the server must send an adequate amount of packets to the networked client to ensure a smooth viewing experience (e.g., video playback without any stutters). Based on the client device's available bandwidth, the server can calculate an adequate bit rate to stream video without interruptions. For instance, the server could provide an interface through which the user can select a bit rate, based upon user knowledge of the client device available bandwidth. One drawback to this approach, however, is that the user must be sophisticated enough to choose the optimal bit rate in order to stream video without interruptions. Moreover, users may frequently select a bit rate that is too high for their current network bandwidth, due to a user preference for higher quality video content. Another approach is for streaming servers to dynamically select the streaming bit rate depending on current network conditions. Additionally, some content servers may use an adaptive bit rate, where the bit rate is adjusted as the video stream is being delivered according to changes in the available bandwidth of the client device. For example, some content servers are capable of adjusting the adaptive bit rate to account for bandwidth fluctuations or changes, e.g., on a per-chunk of video data basis.

SUMMARY

Embodiments of the present disclosure provide a method, computer program product, and system for performing an operation for dynamic content streaming. The operation includes determining, based on analyzing respective client data of each of multiple client devices, a respective profile corresponding to a current session on the respective client device. The operation also includes determining, based on the respective profile for each client device, a respective custom video modification to apply to a first video stream. The operation also includes applying the respective custom video modification to the first video stream to create, for each client device, a distinct, modified video stream having a relatively greater measure of conformity to the respective profile than prior to modification. The operation also includes transmitting each modified video stream to the respective client device for output.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
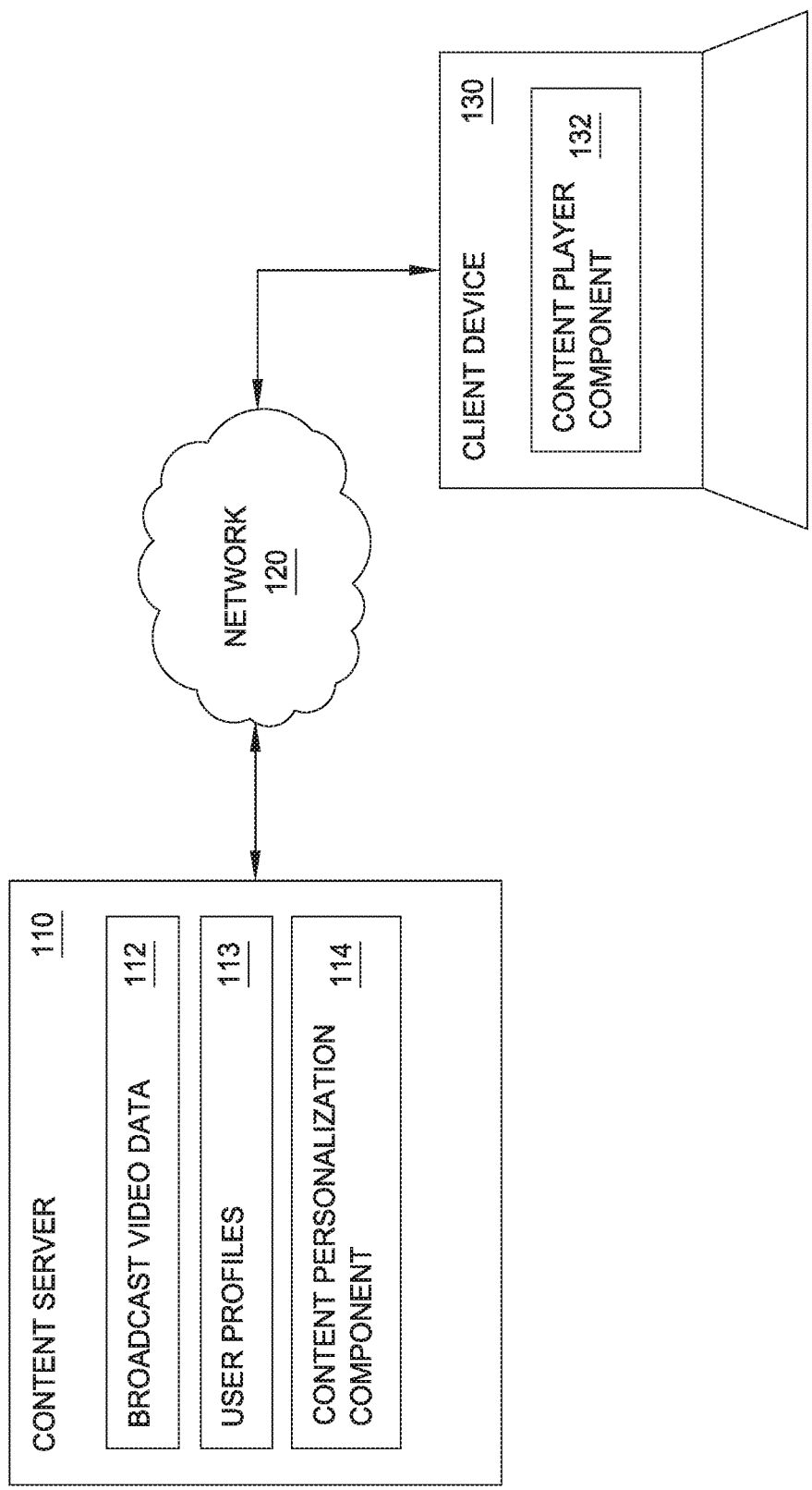
FIG. 1 is a block diagram illustrating one embodiment of a system to provide customized content to users, according to one embodiment described herein.

In an attempt to keep media consumers engaged, certain video streaming services have begun to offer on-demand video services or other online streaming. Generally, on-demand video services allow a user to select from a plurality of content selections for substantially immediate playback. Many broadcast media services also now offer their broadcast stream in an online form. Additionally, efforts have been made in broadcast media to engage consumers through offering the ability to pause, rewind, fast-forward, and record a linear stream of media so that it may be consumed at a time and pace which is more convenient to the user.

The broadcast media landscape has fundamentally changed with the introduction of options like video on demand (VOD) and online streaming of content. Nevertheless, the current broadcast media landscape largely remains static and linear. As such, many traditional linear networks are finding the need to enhance their offerings to engage, retain, and build their audience in order to thrive in the new broadcast landscape. While current linear networks provide a single media experience which is shared between a large number of consumers, there is a need for more dynamic and customized offerings by traditional linear networks in order to meet the expectations of modern media consumers and in order to engage, retain, and build an audience and meet the demands of the modern media consumer.

While previous broadcast media maintained a one-to-many system, where a relatively large number of individuals receive a static video stream, embodiments of the present disclosure provide consumers of broadcast multimedia with a more engaging and unique experience. By enabling a media consumer to receive a highly customized and unique stream, the present disclosure bridges the current gap between content providers and consumers, and creates a more interactive and dynamic experience.

One embodiment provides a method that includes receiving, at a content streaming server, a first video stream to transmit to a client device. In such an embodiment, the first video stream is a broadcast television stream. The method also includes determining a user profile corresponding to a current session on the client device. For example, embodiments could determine a user that is currently logged in on the client device (e.g., the user that will be watching the broadcast television stream). The method further includes determining one or more custom video modifications to apply to the first video stream, based on the determined user profile and then applying the determined one or more custom video modifications to the first video stream to create a modified video stream. The modified video stream can then be transmitted to the client device (e.g., over the Internet).

Generally, any number and type of custom video modifications can be applied to the broadcast video stream, consistent with embodiments described herein. For example, such customizations can include any number of various parameters that can be modified, including but not limited to the color(s) of various objects or regions of the frame. Modifications may also include changing the audio that is a part of the stream, such that each user receives audio that is selected and tailored to their unique preferences and choices. Similarly, the video stream may include a "Disney character experience" which is unique to each customer, and is based on their selections or preferences. Finally, the stream customizations may include a story mode, which enables the user to receive a totally unique experience by allowing them to decide on the outcome of an episode of a TV show, or to affect the way the story progresses based either on explicit choices or preferences of the user.

FIG. 1 is a block diagram illustrating one embodiment of a system to provide customized content to users. As shown, Content Server 110 contains Broadcast Video Data 112, User Profiles 113, and Content Personalization Component 114. Broadcast Video Data 112 represents the video stream that the content server hosts and transmits out to each user. For example, the Broadcast Video Data 112 can represent a digital encoding of a static broadcast video stream delivered to users over traditional channels (e.g., broadcast television delivered via coaxial cable or satellite transmissions). Generally, User Profiles 113 store data profiles describing each of a plurality of users of the content streaming site. For instance, the User Profiles 113 could include information about each user, including their favorite colors, favorite characters, viewing habits, demographic information, and any other data that may be useful for customizing video. By storing the User Profiles 113 on the Content Server 110, the Content Server 110 can customize the stream to each user dynamically and in real-time.

Generally, Content Personalization Component 114 uses the data in the User Profiles 113 to modify the Broadcast Video Data 112 in order to create a user-tailored broadcast video stream. The Content Server 110 is communicatively coupled to the Client Device 130 via Network 120, which may be any suitable network, so long as it is capable of performing the tasks described herein. Thus, the Content Personalization Component 114 could then output a highly customized video stream for each user via a Network 120, and the customized video streams could then be output for playback on each Client Device 130.

Continuing with FIG. 1, the Client Device 130 contains a Content Player Component 132. This component receives the customized stream from the Network 120 and displays it for the user to view. In some embodiments, the Content Player Component 132 also records user-specific information for use in the User Profiles 113. The Content Player Component 132 could record things like viewing habits and content choices, and transmit this data to the Content Server 110 via the Network 120. The Content Server 110 may then use the data received from the Content Player Component 132 to update the User Profiles 113. Alternatively, the Client Device 130 could receive data from a second component, separate from the Content Player Component 132, that records the user's preferences and habits, and transmits the data to the Content Server 110 (e.g., a software component on the Client Device 130).

Figure 2:
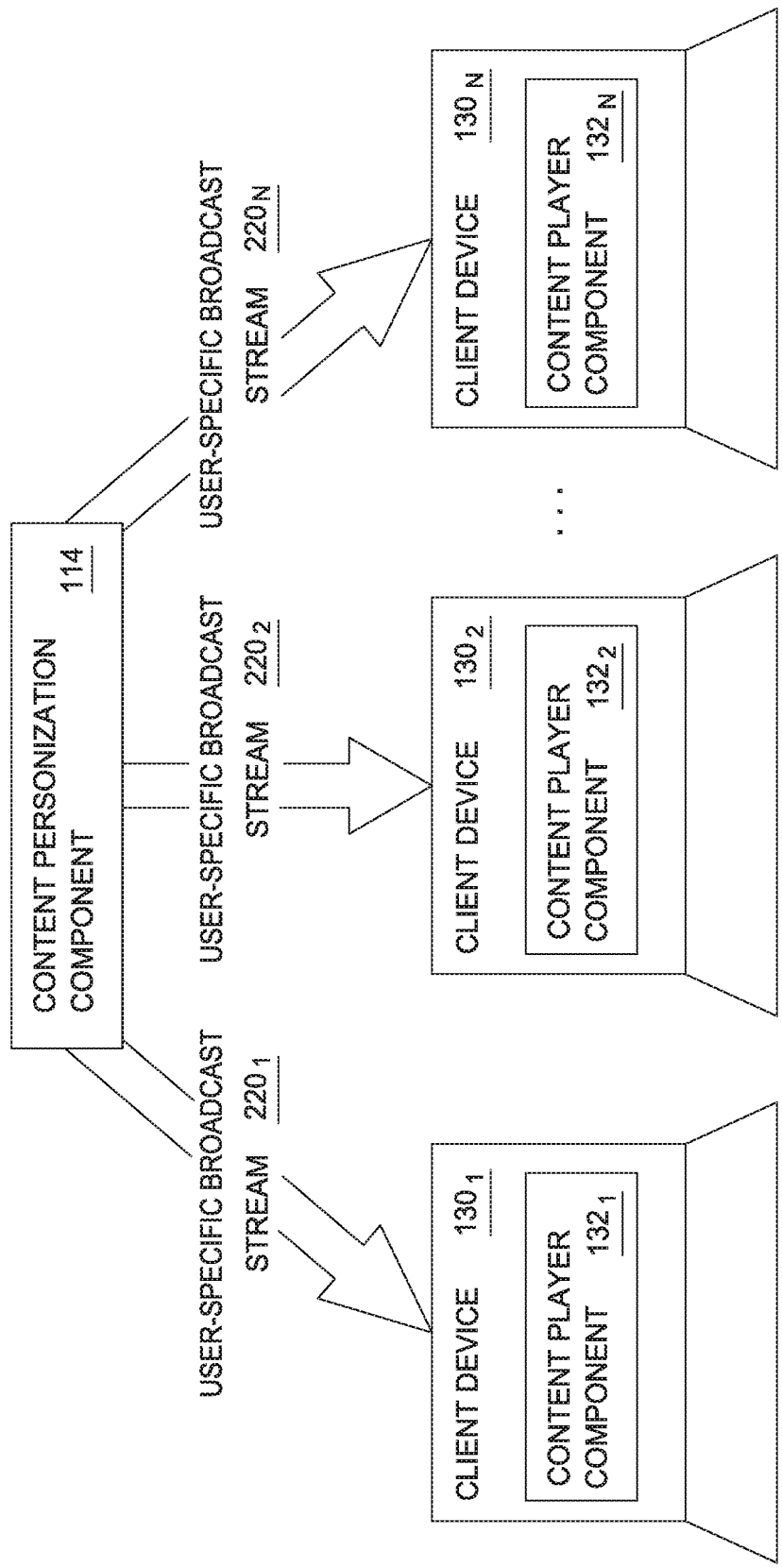
FIG. 2 illustrates transmitting customized video content to various users within a content delivery system, according to one embodiment described herein.

FIG. 2 illustrates transmitting customized video content to various users. Content Personalization Component 114, which is contained within Content Server 110 (FIG. 1), receives Broadcast Video Data 112 and, based on User Profiles 113 (FIG. 1), modifies the video and transmits User-Specific Broadcast Stream $220_{1-N}$. Generally, each of the User-Specific Broadcast Stream $220_{1-N}$ represents a highly unique and customized video stream based on the user profile associated with the respective user who is consuming the media on each respective Client Device $130_{1-N}$. Thus, Content Personalization Component 114 transmits Broadcast Stream $220_1$ to Client Device $130_1$, Broadcast Stream $220_2$ to Client Device $130_2$, and so on, with Broadcast Stream $220_N$ being transmitted to Client Device $130_N$. In this way, each individual user receives a stream of video content that is uniquely tailored to them, and personalized differently from every other stream. As shown, each of Client Devices $130_{1-N}$ is configured with a respective one of Content Player Components $132_{1-N}$. Generally, the Content Player Components $132_{1-N}$ represent any software component capable of playing a digital video stream. Upon receiving the respective Broadcast Stream 220, each Client Device 130 can output the received Broadcast Stream 220 using the respective Content Player Component 132.

Figure 3A:
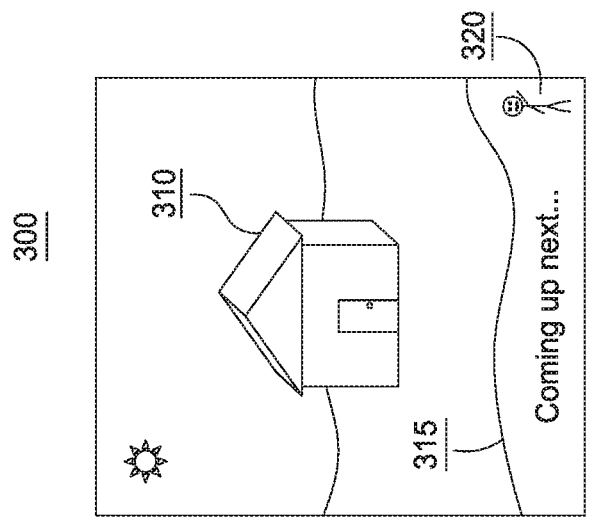
FIGS. 3A-C illustrates frames of customized broadcast video streams, according to embodiments described herein.
Figure 3B:
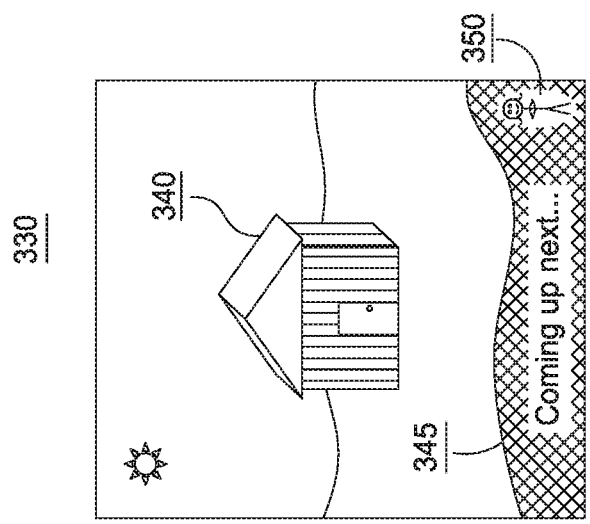
Figure 3C:
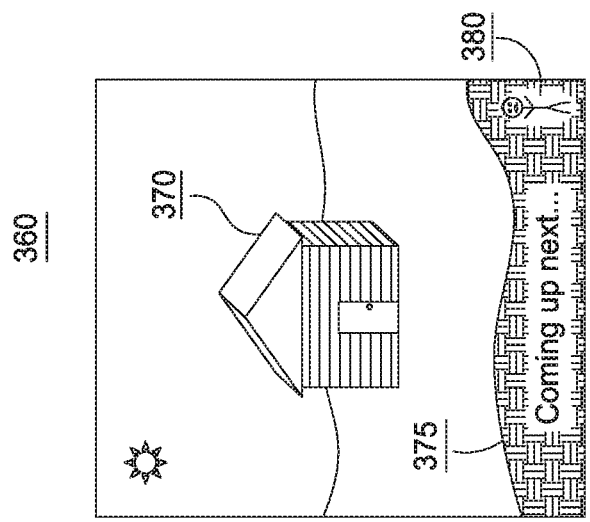

FIGS. 3A-C illustrates frames of customized broadcast video streams, according to embodiments described herein. More generally, FIGS. 3A to 3C illustrate one example of a stream customization that can be accomplished by the present disclosure, e.g., frames of the Broadcast Streams $220_{1-N}$, received at Client Device $130_{1-N}$, respectively. In FIGS. 3A to 3C, all three users are consuming identical content, which contains a house 310, 340, 370 in a field. In FIG. 3A, the frame 300 depicts the house 310 is colored with a default color, e.g., because the user currently associated with Client Device 130a has indicated that he or she does not wish their preferences to be tracked, because they have just begun using the service and do not yet have a developed profile, or any other reason.

On the other hand, as shown FIG. 3B, the frame 330 depicts the house 340 as having a different color or pattern, illustrated by vertical lines. That is, in such an example, the Content Personalization Component 114 has modified the video stream to which frame 330 belongs, based on the preferences and data stored in one of the User Profiles 113. As an example, if the User Profile 113 indicates that the currently signed in user has a favorite color of blue, the house 340 could be colored in a shade of blue based on the user's personal preferences.

As another example, FIG. 3C illustrates a frame 360 in which the house 310c has been colored or textured in yet another different way, once again based on the User Profile 113 of a current user (e.g., the user currently associated with Client Device 130c). This customization is illustrated as horizontal lines. However, one of ordinary skill in the art will quickly recognize that any number of different visual (and auditory) customizations can be applied to the video stream, consistent with the functionality described herein, and that the depicted embodiments are provided for illustrative purposes only and without limitation. Thus, FIGS. 3A-3C illustrate how many different users can all consume identical base content. Nevertheless, each of the users will actually receive highly customized and personalized content based on the data in their User Profile 113. Of course, these customizations can go far beyond coloring in a portion of the screen, and changing the color of the houses 310, 340, 370 only illustrates one embodiment of the present disclosure.

FIGS. 3A-3C further illustrate how the Content Personalization Component 114 may alter the stream by adjusting the color or pattern of areas of the screen that are not a part of the episode or content being streamed, such as a the bumpers 315, 345, 375. If the house 310, 340, 370 is modified, it is a content creator who marked it as customizable. On the other hand, as the bumpers 315, 45 and 375 may be inserted into the video stream after the original content is created, a different person may be responsible for including the bumpers 315, 345, 375, and that person may mark that portion of the stream as open to modification. As an example, the Content Personalization Component 114 could color each of the bumpers 315, 345 and 375 differently, based on a user profile corresponding to a user who will be watching the respective video stream. Thus, for example, the Content Personalization Component 114 could color the bumper 345 in a shade of blue, based on data within a user profile indicating that the currently watching user's favorite color is blue. On the other hand, the Content Personalization Component 114 could color the bumper 375 with a shade of pink, based on data within a different user profile indicating that the currently watching user's favorite television character is associated with the color pink.

FIGS. 3A-3C additionally illustrate how customized graphics 320, 350, 380 may be incorporated into a video stream. Each of the graphics 320, 350, 380 may be various characters from a single show. In this embodiment, the Content Personalization Component 114 may choose to insert a graphic into the stream based on the User Profile 113. For example, if the Content Server 110 has determined what the user's favorite character is based on the user profile for the user, the Content Personalization Component 114 could insert a depiction of that character into a banner portion of the video frames (e.g., the character 350 in banner 345 of frame 330). Alternatively, the graphic chosen could depend on the gender of the user, the age of the user, or any other data contained within the User Profile 113. In this way, each user receives a highly customized stream, and even the bumpers that lead in to an episode can be personalized, thereby providing more engagement and interaction with the user.

More generally, embodiments of the present invention allow changing the color of all or part of video content, based on user preferences of a user determined to be watching the video stream. The Content Personalization Component 114 could determine the user preferences, for example, based on the user selecting their favorite color. The user preferences could also be determined based on other preferences of the user, which are stored in a user profile. For example, a user profile may specify that a particular fictional character is a user's favorite character, and the fictional character could be related to a particular color (e.g., a certain shade of pink). Accordingly, the Content Personalization Component 114 could determine that the user may have a preference for the particular color, based on the user's preference for the particular fictional character.

Additionally, the Content Personalization Component 114 could determine a user's color preference based on a variety of factors, including previous color selections from the user, previous content selections from the user, or other previous selections from the user that are not directly related to color. For example, if a user has previously selected content from a particular show, a color may be selected that matches a character or major theme in that show. Similarly, the user profile may indicate that a certain character is a user's favorite, and the color may be chosen based on that preferred character. Additionally, the color may be chosen based on a user preference that is totally unrelated to the content that is being broadcast. For example, if the user profile indicates that the user is a fan of a particular sports team or artist, or is from a particular country, the color choice and other customization choices may be influenced by that information. In some embodiments, the user profile could also include an indication that the user does not like a particular color or set of colors, and the system may avoid selecting those colors in response.

In one embodiment, the Content Personalization Component 114 could select a custom color (or other augmentation) based on a group or demographic which the user belongs to, without an explicit indication from the user regarding the user's individual preferences. Such an embodiment is useful when the user profile does not yet contain sufficient data to make a prediction as to a user's personal preferences. For example, when a user has just begun using the service, their user profile may be relatively empty. In such a situation, the Content Personalization Component 114 could choose a color based on color preferences of people of similar age to the user, or who are located in a similar locale. These 'default' color choices may be driven by not only age and location of the user, but also by any other criteria which describes the user. Similarly, a default color could be chosen by, for example the content creator, which is to be used whenever a customized color cannot be selected. This could occur when the user profile is empty, or when the user profiles is unavailable for some other reason. Of course, while it is contemplated herein that the Content Personalization Component 114 could consider demographic and other metadata describing the user viewing the video stream, embodiments may only collect and consider such data with the permission of the user (or, in the case of a minor, the user's parent or guardian).

When a decision is made to modify the video stream by changing the color of all or a portion of the frame, the Content Personalization Component 114 on the content streaming server may augment frames of the video stream based on the user's personal preferences and the modified video stream may be transmitted to the user. Alternatively, the unmodified video stream may be transmitted to the user, and the client device may make the modification locally before displaying the stream to the user. Regardless of where the color application occurs, the portion of the frame to be colored can be defined by the creator of the content as "blank" or of undefined color. For example, a content creator could define a vehicle within a plurality of frames of a video stream as "blank," and the color of the vehicle could then be dynamically filled at playback. This definition can occur during post-editing. Rather than merely overlaying the selected color on top of the existing frame, the present disclosure involves changing the pixel values at the resolution level of the video stream. In this embodiment, embedded code is established within the promotional or long-form element which allows the creator to define what areas can be re-colored, graphically enhanced, or where contextual information can be inserted. These areas can then be dynamically augmented and adjusted in real time.

Similarly, other areas of the video stream may be defined by the content creator as open to modification. Such modifications could include graphically enhancing the identified area, or inserting contextual information. Such graphical enhancements could include a character that is selected by the user or based on the user profile. In this way, the stream can be highly customized to the end user, which provides a more engaging and dynamic experience.

Contextual changes that may be made include fields on the video stream which are defined to allow text information to come across. For example, preferred fonts, language, text color, and other options may be utilized in order to modify captions, signage, or other text information visible in the frame. These contextual and graphically enhancements can lead to a more engaging experience that is highly customized and unique to the user.

In addition to augmenting the broadcast video stream, the Content Personalization Component 114 can modify the audio stream(s) of the broadcast video as well based on the viewer's individual preferences. For example, an audio selection may be made based on any of the methods described above. As an example, the Content Personalization Component 114 could select between various genres of a theme song for a particular show, based on a user's individual preferences. As an example, the Content Personalization Component 114 could augment a video stream for a particular user who has an affinity towards rock music (i.e., as specified in the user's profile) to include a rock theme song for a particular show, while the Content Personalization Component 114 could modify a video stream for another user who has an affinity towards hip hop music to include a hip hop version of the same theme song for the particular show. The audio could also be various styles of background music or other musical cues that can be customized and targeted towards each individual user based on their preferences and selections.

In one embodiment, the Content Personalization Component 114 provides an interface through which a user can select content that he or she wishes to consume. Upon receiving the user selection of content, the Content Personalization Component 114 could identify additional content to present to the user, based in part on the content which the user selected and on the user profile. The Content Personalization Component 114 could then provide this identified content to the user. For example, if a user selects an episode of a show, upon finishing the episode, they may receive a prompt which indicates other shows the user may enjoy. The user may also receive a notification that a new episode of that show is scheduled to be broadcast at a certain time and date, or that other episodes of the same show are available.

In a further embodiment, the client device may include a pre-fetch content handler, which retrieves and caches content or data locally. This retrieved content could be content which was identified as something the user may be interested in viewing next, or any other data which is selected based on the preferences and selections of the user. Doing so enables to user to begin viewing the pre-fetched content substantially immediately upon selecting the content.

In one embodiment, in addition to storing user preferences and demographic data in the user profile, the user profile may contain information about the user's viewing habits. For instance, the time of day that the user consumes content could be recorded, or the duration that the user consumes the content for before switching to a different media or turning off the system. The Content Personalization Component 114 could consider this data about the viewing habits of the user when determining modifications and content selections that are made, so that the user is optimally engaged in the programming. For example, the user profile could lead to a selection of one augmentation in the mornings, but if the same content is consumed in the afternoon or at night, a totally different augmentation may be selected. This allows the customized stream to vary not just based on the preferences of the user, but also based on his or her viewing habits, and based on the time of day, day of the week, or time of the year that the user is consuming the content.

In a particular embodiment, the Content Personalization Component 114 can collect demographic data and preferences associated with the user profile by providing a questionnaire to the user. Such a questionnaire could be completed all at once, or may be provided to the user distributed over the course of several sessions so as to minimize the time consumed in any one sitting and increase the number of questions that the user will ultimately respond to before quitting the questionnaire in favor of viewing streaming content. Alternatively or in combination, the Content Personalization Component 114 could collect the demographic data and preferences from various social media websites that the user is a member of. For example, the user may log in to various social media pages on the client device. Information about what the user such as his or her likes, what the user's friends like, and demographic information may then be collected and used to assemble the user profile. Advantageously, doing so allows a more complete profile to be constructed without interfering with the user's experience by constantly presenting questions and preference selections to be answered. In this way, a more engaging and immersive experience can be obtained that is even more unique and dynamic to each individual user.

While the user consumes media content and makes choices, the Content Personalization Component 114 may constantly update and adjust the user profile. In this way, even if the user never answers a single question and never logs in to a single social network, the decision engine can nevertheless create a powerful profile for the user and the video stream can be dynamically customized and adjusted so that the unique user receives a unique experience. Doing so enables maximum engagement and involvement, while simultaneously ensuring minimum interference with the broadcast media experience received by the user.

In one embodiment, the particular modifications that can be made to the content stream may be constrained by one or more rules established by the content creators or by network administrators. For example, certain colors could be deemed to be preferable for a certain object. When a color is selected for each individual user, the selection may be restricted to only the identified color palette provided by the network. Similarly, certain colors may be identified as not preferable, because they would lead to clashing color schemes or would not work well within the context of the scene. In this case, the content creators or network administrators may not allow the selection of these restricted colors. In a related embodiment, certain graphical augmentations may be deemed to be unused or sparsely used. In such a case, the content creators or network administrators may decide to replace these unused graphic options and introduce new options. Any other modifications that are possible to apply to the stream may be likewise restricted or affected by the content creators or network administrators, including audio selections and content that is available to view. These restrictions may be implemented for any number of reasons, including the time of year, the time of day, the day of the week, the individual user profile, what is currently popular, or any other business reason.

In the above embodiment, the Content Personalization Component 114 may provide the user with a notification that a new color palette, graphical augmentation, or audio selection is available for selection. This notification could be triggered by the content creators, or could be automatic based on the user profile and preferences. This would allow the user to interact with the stream relatively uninterrupted because he or she does not have to check whether new options are available. At the same time, the user is assured that if new options are available, they will be notified so that they may change their preferences or selections immediately, and begin enjoying the new selections. This allows for an even more dynamic and engaging experience that changes not just between users, but also at different times for a single user.

The Content Personalization Component 114 can also be configured to provide a story mode for user tailor broadcast video streams. In this embodiment, a single episode of a show may contain a plurality of various storylines and endings. To enable these various storylines within the same cohesive story framework, the content creators could prepare multiple individual storylines that each constitute a complete story or episode. The multiple individual storylines may nevertheless have an overarching theme or progression, so that the stories diverge at key points and re-converge at a later key point. In this way, the Content Personalization Component 114 can select a different storyline arc for a particular user at each key point within the story, thereby allowing a large number of distinct storylines can be constructed for each episode. Doing this allows the user to receive a truly unique experience when consuming multimedia, and enables greater engagement.

In one embodiment, the Content Personalization Component 114 is configured to select one of the diverging storylines based on feedback from the user. When a key decision point is reached, the Content Personalization Component 114 could prompt the user to select a general mood or emotion that they wish the episode to follow. Alternatively, the Content Personalization Component 114 could prompt the user to select a specific action they wish one or more characters to take at the key decision point, which determines which direction the story arc progress in. In an alternative embodiment, the Content Personalization Component 114 automatically decides decision point based on the user's profile and a progression is selected because the user's profile indicates that selection would result in an engaging show for the individual user. In yet another embodiment, the Content Personalization Component 114 is configured to manage the progression of the story may operate in "surprise" mode, where the Content Personalization Component 114 selects an operation option which is most unlike what the user would normally prefer is selected, which results in a new and interesting experience for the user. In yet another embodiment, the Content Personalization Component 114 operates in a "random" mode, where the various options and decisions are selected randomly or pseudo-randomly. This allows the user's experience of a single show to vary widely from other users, and even allows the same user to receive a widely different experience when viewing the same show, based on his or her changing preferences, his or her changing selections, and when the user consumes the episode.

In some embodiments, the client device may be associated with more than one user (e.g., multiple members of a single family). In such an embodiment, the group of users could all have a single joint user profile, or there could be multiple joint group profiles for the single client device. For example, if a family all consumes media on a smart TV, the Content Personalization Component 114 could maintain a joint user profile for all of the children in the family, as well as a joint user profile for all of the adults in the family. Alternatively or additionally, the Content Personalization Component 114 could maintain a joint user profile which encompasses the entire family as a unit. Similarly, the Content Personalization Component 114 could maintain a unique individual user profile for each individual user within the family, in addition to or instead of any joint profiles they may contribute to. In this way, the experience can be tailored on an individual level and on a group level, and maximum engagement can result.

In the event that multiple user profiles are associated with a single client device, it may be necessary for the content streaming server to be able to disambiguate the various users, so that the modifications and customizations made can be tailored to the user(s) who is actually watching, rather than some generic modification for the client device in general. To accomplish his, the content server may recognize a current session, which identifies which user or group of users is currently consuming the media stream. The current session may be determined in any number of ways. For example, the user may be prompted to select their user profile when they begin viewing the stream. Alternatively or in addition, the content streaming server may determine which user is currently using the client device based on the content selections made. For example, if the user selects a channel that streams children's shows, the content streaming server may determine that a child is viewing the stream. If the client device is only associated with one child, or if there are multiple children's user profiles associated with the device, then the content server may being customizing the stream based on the one or more children's user profiles. As the user continues to consume the stream, the content server may continue to refine its determination, until the current user can be known with some level of certainty. The content server may determine the user consuming the current session using any method currently known, including analyzing video from a camera at the client device, receiving fingerprint information, voice recognition, or any other method.

Figure 4:
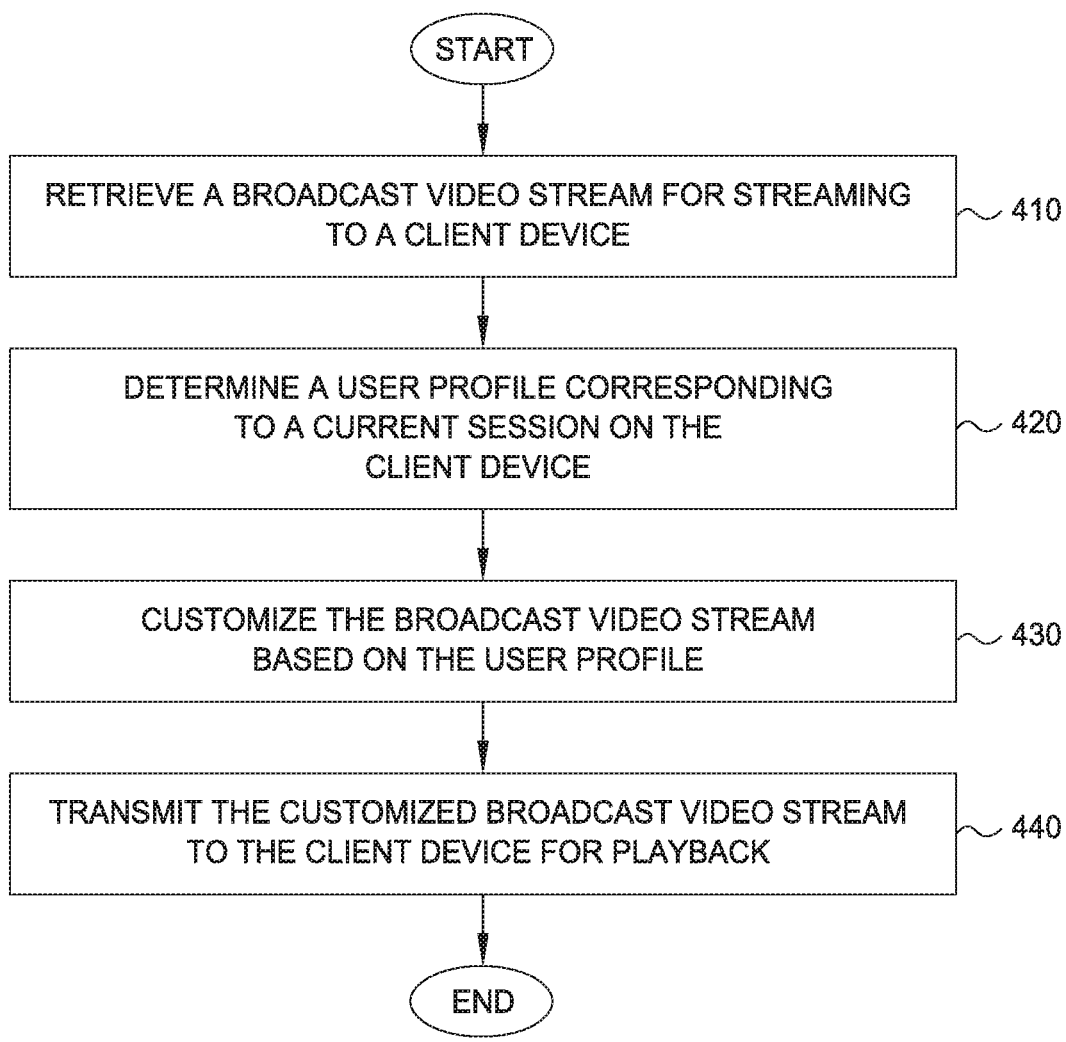
FIG. 4 is a block diagram illustrating a method for customizing a broadcast video stream, according to one embodiment described herein.

FIG. 4 is a block diagram illustrating a method for customizing a broadcast video stream, according to one embodiment described herein. As shown, the method 400 begins at block 410, where the Content Personalization Component 114 retrieves a broadcast video stream for streaming to a client device. For example, the broadcast video stream could be a digital video stream that is digitally encoded from a traditional broadcast video stream (e.g., for transmission over coaxial or satellite communication media). In one embodiment, the Content Personalization Component 114 is configured to select a video stream based on technical capabilities of the client device (e.g., hardware specifications of the client device, a measure of current network bandwidth of the client device, etc.).

The Content Personalization Component 114 then determines a user profile corresponding to a current session on the client device (block 420). For instance, the Content Personalization Component 114 could determine a particular user is currently logged into the client device and could retrieve a user profile corresponding to the particular user. At block 430, the Content Personalization Component 114 customizes the broadcast video stream based on the user profile. As discussed above, such customizations can include augmenting the color of a portion of various frames with the video stream, inserting an animated character within the video stream (e.g., within a banner portion of the video stream), altering an audio stream to play a different version of a theme song for a particular show (e.g., from a genre of music preferred by the current user), altering the video stream to depict a different storyline arc based on the user profile, and so on. The Content Personalization Component 114 then transmits the customized broadcast video stream to the client device for playback to the user (block 440), and the method 400 ends.

Figure 5:
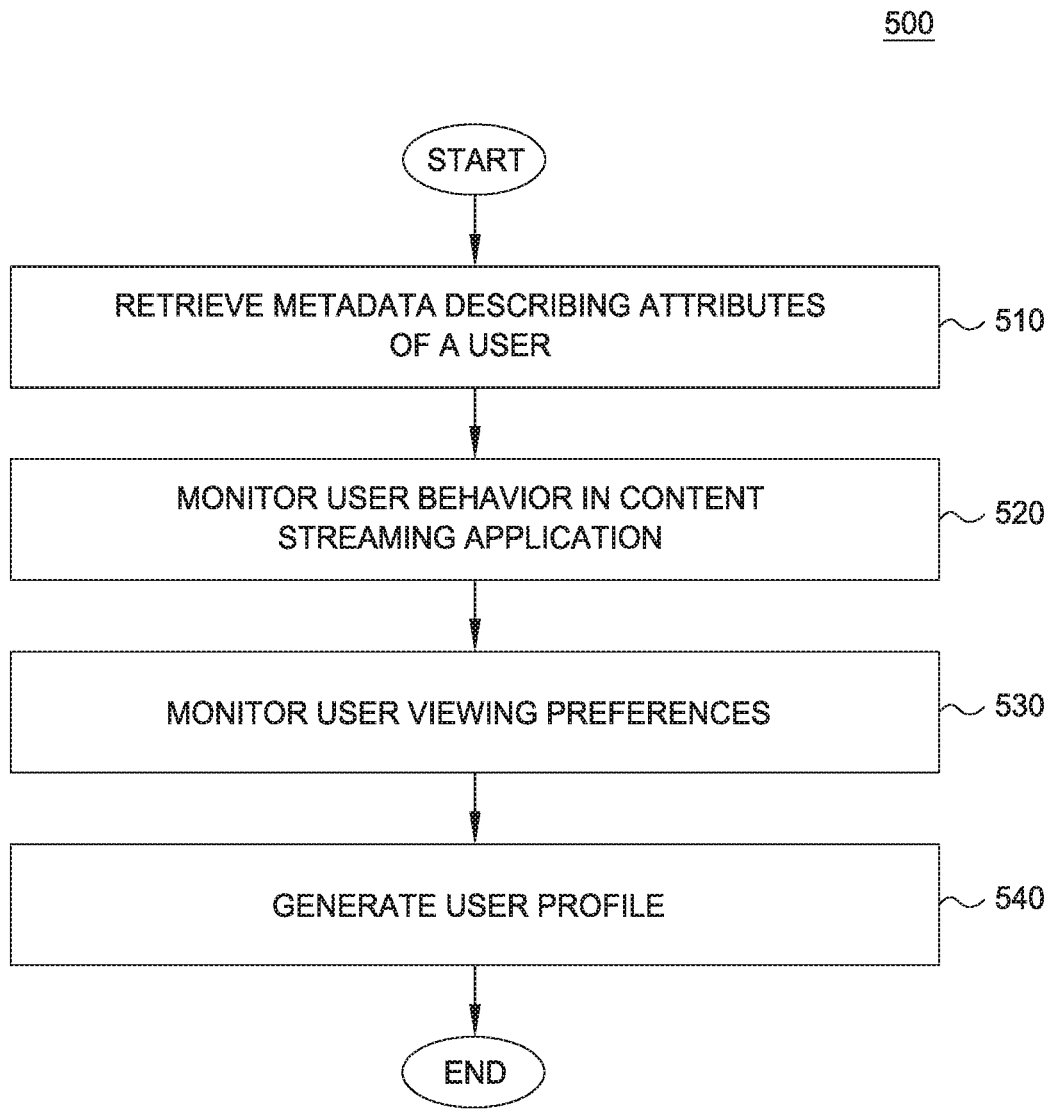
FIG. 5 is a block diagram illustrating a method for generating a user profile for a user, according to one embodiment described herein.

FIG. 5 is a block diagram illustrating a method for generating a user profile for a user, according to one embodiment described herein. As shown, the method 500 begins at block 510, where the Content Personalization Component 114 retrieves metadata describing attributes of a particular user. Such metadata could include, for example, an age of the user (or age range in which the user is classified), a gender of the user, a geographic location of the user, and so on. Of course, the Content Personalization Component 114 can be configured to only collect such information with the explicit permission of the user (or, in the case of a minor, the user's parent or guardian).

The Content Personalization Component 114 also monitors the user's behavior in the content streaming application on the client device (block 520). For instance, the Content Personalization Component 114 could track which video games the user plays on the client device and content pages (e.g., web pages) the user browses on the client device, and the Content Personalization Component 114 could use this information to determine the user's preferences. For instance, if the user plays games and browses through social media sites relating to a particular comic book character, the Content Personalization Component 114 could determine that the user has an affinity towards that particular comic book character.

Additionally, the Content Personalization Component 114 can monitor the user's viewing preferences (block 530). For instance, if a user frequently watches a particular television program relating to the particular comic book character, the Content Personalization Component 114 could determine that this further indicates an affinity towards the particular comic book character. The Content Personalization Component 114 then generates a user profile describing the preferences of the user using the collected information (block 540), and the method 500 ends.

Figure 6:
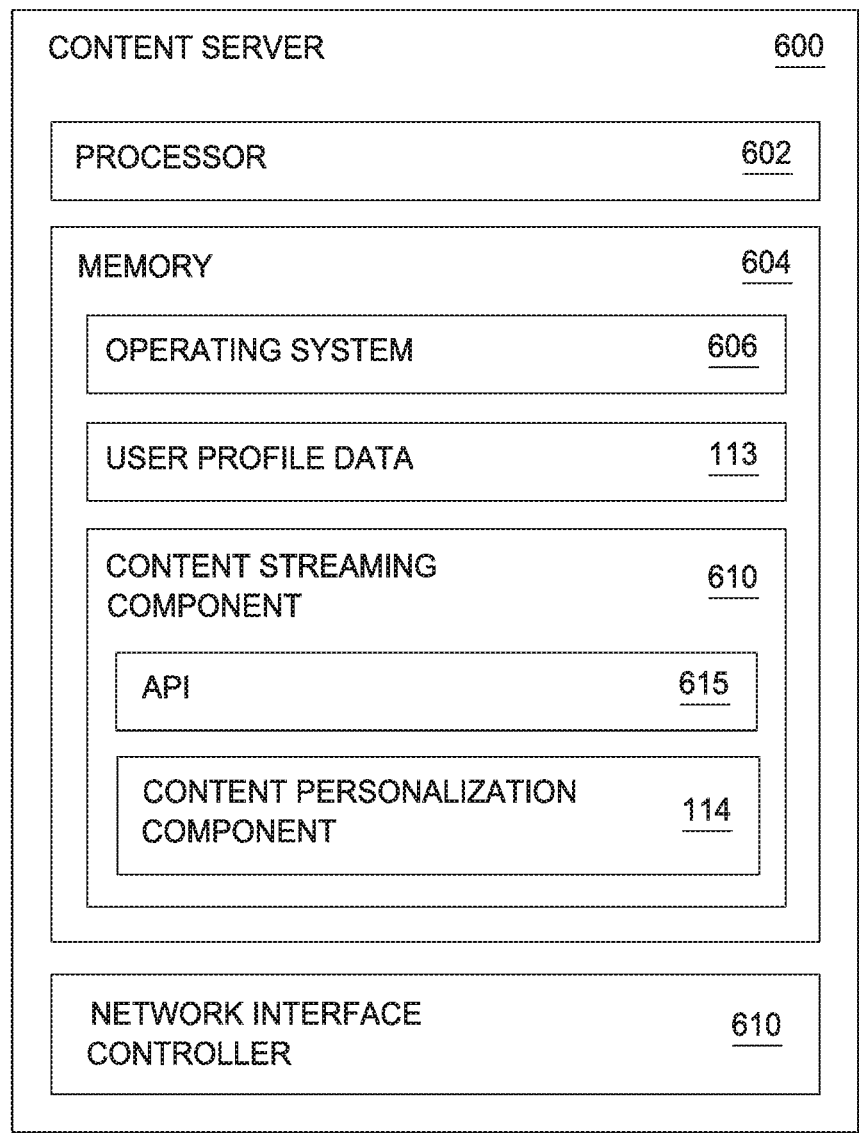
FIG. 6 is a block diagram illustrating a system configured with a Content Personalization Component, according to one embodiment described herein.

FIG. 6 is a block diagram illustrating a system configured with a Content Personalization Component, according to one embodiment described herein. As shown, the content server 600 includes, without limitation, a central processing unit (CPU) 602, a memory 604, and a network interface controller 610, each connected to a bus (not shown). The content server 600 may also include an I/O device interface (not shown) connecting I/O devices (e.g., keyboard, mouse, and display devices) to the content server 600. Further, in context of this disclosure, the computing elements shown in the content server 600 may correspond to a physical computing system (e.g., a system in a data center) or may be a virtual computing instance executing within a computing cloud.

The CPU 602 retrieves and executes programming instructions stored in the memory 604 as well as stores and retrieves application data residing in the memory 604. An interconnect (not shown) can be used to transmit programming instructions and application data between CPU 602, I/O devices interface, storage media (not shown), network interface controller 620, and memory 604. Note, CPU 602 is included to be representative of a single CPU, multiple CPUs, a single CPU having multiple processing cores, and the like. Memory 604 is generally included to be representative of a random access memory. Storage such as a disk drive storage device can also be connected to content server 600. Such storage may be a combination of fixed and/or removable storage devices, such as fixed disc drives, removable memory cards, or optical storage, network attached storage (NAS), or a storage area-network (SAN).

Illustratively, the memory 604 includes an operating system 606, user profile data 113 and a content streaming component 610 that is configured to provide user-specific broadcast video streams top to users based on user preferences, as specified in the user profile data 113. The content streaming component 610 includes an Application Program Interface (API) and a content personalization component 114. For example, users could access the API 615 to request playback of a particular broadcast video stream (e.g., corresponding to a particular television network) and the content personalization component 114 could generate a custom version of the broadcast video stream based on the user profile data 113. The content streaming component 610 could then transmit the customized broadcast video stream to the network interface controller 620, for delivery to a client device associated with the user (e.g., via the Internet).

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of dynamic content streaming, the computer-implemented method comprising:
   tracking viewing activity of a user within a content streaming application at a client device;
   generating a user profile corresponding to the user of the client device, the user profile including the tracked viewing activity of the user;
   designating, as dynamically colorable, a first object included in a first video stream of a media content selected by the user for viewing at the client device via the content streaming application, the designating comprising:
      identifying the first object included in the first video stream;
      defining one or more pixels representing the first object included in the first video stream; and
      designating the one or more pixels to be blank without color and available to be dynamically colorable;
   determining, based on the user profile, a custom video modification to apply to the first video stream, wherein the custom video modification comprises adjusting a color of the one or more pixels without modifying other aspects of the first object included in the first video stream to designate a color of the first object included in the first video stream, effect a change in color of the first object included in the first video stream, or restrict the color of the first object included in the first video stream to a color palette; and
   during playback of the first video stream, applying the custom video modification to the first video stream by operation of one or more computer processors to create a modified video stream having a different measure of conformity to the user profile than the first video stream prior to modification, wherein applying the custom video modification includes altering the first video stream to depict the custom video modification.

2. The computer-implemented method of claim 1, wherein determining the custom video modification to apply to the first video stream is further based on a predefined set of rules that define a plurality of video modifications that are permissible to be made to the first video stream.

3. The computer-implemented method of claim 1, wherein the custom video modification further includes inserting audio content into an audio stream of the first video stream.

4. The computer-implemented method of claim 1, wherein the custom video modification further includes inserting a predefined graphic into a portion of at least one frame of the first video stream.

5. The computer-implemented method of claim 1, wherein the first video stream comprises a digital broadcast television stream.

6. The computer-implemented method of claim 1, wherein the user profile further includes at least one of demographic data of the user or interest data of the user, wherein the demographic data includes at least one of a user age or a user location, and wherein the interest data includes at least one of a favorite character, a favorite show, a favorite sports team, or a favorite artist.

7. The computer-implemented method of claim 6, wherein the at least one of the demographic data or the interest data is collected from a social media page associated with the user.

8. The computer-implemented method of claim 6, wherein the custom video modification comprises effecting a change in the color of the first object included in the first video stream based on the demographic data of the user.

9. The computer-implemented method of claim 1, wherein the custom video modification further includes a storyline arc selected from a plurality of alternative storyline arcs of the media content and each storyline arc of the plurality of alternative storyline arcs comprises a distinct ending of the media content.

10. The computer-implemented method of claim 1, wherein the custom video modification further includes inserting a storyline arc selected from a plurality of alternative storyline arcs into the media content, wherein the plurality of alternative storyline arcs re-converges in the media content.

11. The computer-implemented method of claim 1, wherein the user profile includes a color preference, and wherein the custom video modification includes assigning a color of the one or more pixels of the first object to match the color preference.

12. The computer-implemented method of claim 1, wherein the custom video modification further includes inserting a storyline arc selected from a plurality of alternative storyline arcs of the media content, the storyline arc is selected based on a plurality of modes, and the plurality of modes comprise at least one of a story mode for selecting the storyline arc in conformance with the user profile, a surprise mode for selecting a storyline arc in adverse conformance with the user profile, wherein the surprise mode selects a storyline arc most unlike a preference of the user, or a random mode for selecting the storyline arc independent of the user profile.

13. The computer-implemented method of claim 12, wherein the plurality of modes comprise the story mode, the surprise mode, and the random mode.

14. The computer-implemented method of claim 1, wherein the user profile comprises a joint user profile associated with a plurality of users.

15. The computer-implemented method of claim 1, wherein a plurality of users are associated with the client device, each user of the plurality of users having an associated user profile, and wherein the computer-implemented method further comprises recognizing a current session to identify a first user of the plurality of users as the user and a first user profile associated with the first user as the user profile.

16. The computer-implemented method of claim 15, wherein recognizing the current session to identify the first user comprises prompting the first user to select the first user profile prior to playback of the first video stream.

17. The computer-implemented method of claim 15, wherein recognizing the current session to identify the first user comprises selecting the first user based on a conformance of the media content with the first user profile.

18. The computer-implemented method of claim 1, wherein tracking the viewing activity of the user within the content streaming application at the client device comprises tracking one or more of a time of day that the user consumes content within the content streaming application and a duration that the user consumes the content.

19. The computer-implemented method of claim 1, wherein restricting the color of the first object included in the first video stream to the color palette comprises restricting a change of color of the first object to avoid a clashing color scheme.

20. The computer-implemented method of claim 1, further comprising identifying, in a frame of the first video stream, a portion of the frame with one or more pixels blank without color and coloring the one or more pixels before the playback of the first video stream.

21. The computer-implemented method of claim 1, wherein the first object comprises one or more pixels of the first video stream that represent a structure of the first object and are blank without color, and wherein the custom video modification comprises dynamically assigning a color to the one or more pixels of the first object.

22. A non-transitory computer-readable medium containing computer program code executable to perform an operation for dynamic content streaming, the operation comprising:
- tracking viewing activity of a user within a content streaming application at a client device;
- generating a user profile corresponding to the user of the client device, the user profile including the tracked viewing history of the user;
- designating, as dynamically colorable, a first object included in a first video stream of a media content selected by the user for viewing at the client device via the content streaming application, the designating comprising:
  - identifying the first object included in the first video stream;
  - defining one or more pixels representing the first object included in the first video stream; and
  - designating the one or more pixels to be blank without color and available to be dynamically colorable;
- determining, based on the user profile, a custom video modification to apply to the first video stream, wherein the custom video modification comprises adjusting a color of the one or more pixels without modifying other aspects of the first object included in the first video stream to designate a color of the first object included in the first video stream, effect a change in color of the first object included in the first video stream, or restrict the color of the first object included in the first video stream to a color palette; and
- during playback of the first video stream, applying the custom video modification to the first video stream by operation of one or more computer processors when executing the computer program code, to create a modified video stream having a different measure of conformity to the user profile than the first video stream prior to modification, wherein applying the custom video modification includes altering the first video stream to depict the custom video modification.

23. The non-transitory computer-readable medium of claim 22, wherein determining the custom video modification to apply to the first video stream is further based on a predefined set of rules that define a plurality of video modifications that are permissible to be made to the first video stream.

24. A system of dynamic content streaming, the system comprising:
- one or more computer processors; and
- a memory containing a program that, when executed by the one or more computer processors, performs an operation comprising:
  - tracking viewing activity of a user within a content streaming application at a client device;
  - generating a user profile corresponding to the user of the client device, the user profile including the tracked viewing activity of the user;
  - designating, as dynamically colorable, a first object included in a first video stream of a media content selected by the user for viewing at the client device via the content streaming application, the designating comprising:
    - identifying the first object included in the first video stream;
    - defining one or more pixels representing the first object included in the first video stream; and
    - designating the one or more pixels to be blank without color and available to be dynamically colorable;
  - determining, based on the user profile, a custom video modification to apply to the first video stream, wherein the custom video modification comprises adjusting a color of the one or more pixels without modifying other aspects of the first object included in the first video stream to designate a color of the first object included in the first video stream, effect a change in color of the first object included in the first video stream, or restrict the color of the first object included in the first video stream to a color palette; and
  - during playback of the first video stream, applying the custom video modification to the first video stream to create modified video stream having a different measure of conformity to the user profile than the first video stream prior to modification, wherein applying the custom video modification includes altering the first video stream to depict the custom video modification.

25. The system of claim 24, wherein determining the custom video modification to apply to the first video stream is further based on a predefined set of rules that define a plurality of video modifications that are permissible to be made to the first video stream.

26. The system of claim 24, wherein the first video stream comprises a digital broadcast television stream.

* * * * *